United States Patent Office 2,970,171
Patented Jan. 31, 1961

2,970,171

AMMONOLYSIS OF 3-NITRO, 4-CRESOL

John Cryer, New Lenox, and Emmett H. Burk, Hazel Crest, Ill., assignors to The Sherwin-Williams Company, Cleveland, Ohio, a corporation of Ohio No Drawing. Filed Feb. 24, 1958, Ser. No. 716,850

6 Claims. (Cl. 260—581)

The present invention relates to an improvement in a process for the manufacture of meta nitro para toluidine by ammonolysis of meta nitro para cresol.

More particularly the present invention relates to a cyclic process for the continuous manufacture of 1-amino, 2-nitro 4-methyl benzene (meta nitro para toluidine) by ammonolysis of meta nitro para cresol and is a continuation-in-part application of U.S. Serial No. 585,978, filed May 21, 1956, now U.S. Patent No. 2,894,988.

It is established that meta nitro para toluidine may be produced by ammonolysis of meta nitro para cresol and as far as the applicant is aware the only U.S. patent relating to this particular subject is that of Frye and Vagenius, U.S. 2,128,700, wherein one molar proportion of meta nitro para cresol was subjected to a large excess over theoretical of ammonia in 28% aqueous solution (commercial grade) in an autoclave at about 150° to 160° C. for 5 to 7 hours in the presence of a molar proportion of an alkali metal formate. The process of Frye et al. is illustrated herein, in the examples which follow, and the yield obtained thereby is relatively low.

It is the object of the present invention to increase the yields obtained in the ammonolysis of meta nitro para cresol over the prior art processes, not only through control of ammonolysis conditions but by inclusion in the ammonolysis reaction of greater than catalytic amounts of ammonium chloride, a closer control of temperature and temperature level, which is very critical and by recycling a readily recoverable aqueous phase containing valuable constituents heretofore lost.

A further object of this invention is to provide an advance over the batch process previously described in the co-pending application identified above, leading to yields of the order of at least about 95%, wherein losses of raw materials and products of reaction are reduced to a minimum.

The improved cyclic procedure of this invention is based upon the discovery that the reaction mass at any step during the ammonolysis reaction, will upon standing, separate into two liquid phases. The lighter aqueous phase having a density of the order of 0.859 and a heavier oil phase having a density of the order of 0.934. The heavier oil phase contains by far the greater part of the meta nitro para toluidine formed upon ammonolysis. Both phases contain water, meta nitro para cresol (free or as the ammonium salt), meta nitro para toluidine, ammonia, ammonium chloride and degradation by-products. The aqueous phase contains the greatest percentage of water, ammonia and ammonium chloride. Under the reaction conditions at any particular time subsequent to commencement of the reaction, the reaction vessel is under pressure, autogenous to the conditions of processing, due to the high concentration of ammonia in the reaction autoclave.

After a suitable reaction time, upon allowing the reaction mixture to remain quiescent for 30 minutes more or less, one may draw off, under pressure, the heavier oil phase and recover the major proportion of meta nitro para toluidine content from the heavy phase so separated.

While the reaction autoclave is under pressure the content of the reaction vessel, e.g. containing the aqueous phase after withdrawal of the heavier oil phase, is charged back to the original conditions of operation or reaction by pumping back into the reaction autoclave such quantities of the reactants as may be necessary to restore the initial material balance. Pressure necessary to do this may be obtained by several methods. For example, one may use an inert gas, anhydrous ammonia under pressure or mechanical pumps. The ammonolysis reaction may then be carried forward in accordance with a predetermined cycle of operation, the agitation discontinued, the heavier oil phase withdrawn and the process repeated indefinitely.

Obviously many advantages accrue from the described cycling procedure which allows for a constant shift of the yield in favor of the production of meta nitro para toluidine without loss or discharge of the excess ammonia and ammonium chloride necessary to practical yields by a single batch operation.

Under the batch process as described in the co-pending application hereinbefore referred to, the manifold excess of ammonia is vented to the atmosphere, or is only partially recovered, at the end of each amination. Ammonium chloride is discarded or lost and the recovery or disposal of unreacted meta nitro para cresol provides an economic problem. There is additionally under the recycle process a saving in time, for heretofore it has been necessary to continue the batch process for hours after the optimum rate of conversion to meta nitro para toluidine has been passed in order to obtain maximum cost reduction.

In the re-cyling method of the present invention, practically no raw materials are lost and unconverted meta nitro para cresol is retained in the primary reaction autoclave. In the re-cycle process of this invention one need not operate the reaction for the long periods heretofore essential to the batch operation. This is for the reason that both raw material and product may be recovered at any convenient time in the reaction cycle, the product being withdrawn and the unreacted raw material re-cycled for further ammonolysis reaction. Re-design of equipment over to pressure loading offers but minor cost increase as compared with the economic loss suffered under the previous batch system of operation. Since the reactor is kept at reaction temperature and not appreciably diminished from reaction pressure, immediately the charging operation has been completed the amination reaction is again underway and no time is lost in unnecessary production steps.

It is clear from the above conditions that the productive capacity of a given plant installation may be substantially increased by using a short amination time as well as reducing the time essential to the charging and discharging of the pressure autoclave. As indicated previously, the rate of amination is much more rapid during the initial period of the reaction, approximately 82% conversion being achieved in about 16 hours. Since the degradation by-product reactions proceed only slowly during the initial rapid amination period, but much more rapidly during the later stages of amination, shorter periods of actual reaction time are made possible. The re-cycle process of reduced individual reaction periods provides for a much purer crude product of materially enhanced yield with substantial reduction in tar formation.

A further discovery related to the objects of this invention is the importance of actual process conditions. If, for example, any of the components are contaminated with traces of metal ions, or if the reaction is conducted in an unlined iron vessel, yields fall off. Minor proportions of metals have been found to cause serious deterioration in yield. It has been found that Number 316 stainless steel vessels are suitable for the purposes of this invention, but that uniformly high yields are obtained only after a number of runs have been made, and the walls of the stainless steel vessel have been so coated as to passivate the metal walls and inhibit passing into solution of the metal ions of the containing vessel.

Another object of this invention is to control reaction temperature conditions during processing so that instead of formation of tars as by-products as in prior art processes, some unreacted meta nitro para cresol is recovered and recycled but not lost. The principal advantage of the process herein outlined is that yields of purified meta nitro para toluidine of the order of about 95% are consistently attained.

The method of manufacture of meta nitro para toluidine, to which this invention is directed, comprises subjecting one molar proportion of meta nitro para cresol, at least about one mol of ammonium chloride (more than merely a catalytic amount) and at least 6 mols of ammonia in an aqueous environment wherein the molar ratio of ammonia to water is at least of greater numerical value than 1:2 in an autoclave passivated against metal ion donation under the conditions of the processing, to the autogenous pressures which develop in an autoclave at temperatures above 125° C. but not exceeding 150° C. and preferably less than 145° C. for from about 5 to 20 hours, or for a time insufficient to complete substantially the ammonolysis of said cresol. Temperatures of as high as 165° C. have been used but are not preferred as tar formation has an inordinately large increase at this temperature level. Times of the order sufficient to substantially complete the amination, of the order of 40 to 60 hours, are also operable but obviously without economic advantage. Subsequent to the incomplete ammonolysis, the agitator is shut off and the reactant medium in a quiescent state separates into a heavy oil phase and a lighter aqueous phase. The heavy oil phase is bled off from the bottom of the reactor at the temperature and under the pressure of the reactor-autoclave. The heavy oil layer is processed to recover the meta nitro para toluidine and the light aqueous phase still within the reactor-autoclave is brought back to re-establish the initial concentration conditions of the reactants present in the reaction vessel at the start of the reaction by means of pressures over the reactants as they are charged greater than those in the reactor-autoclave. As is well known, this may be accomplished by various means. The reaction time-temperature schedule is again imposed upon the reactor-autoclave, the heavy oil phase withdrawn and make-up addition to the light aqueous phase again forced into the reaction vessel.

The general technique involved in the process, when operating on a laboratory scale, is to cool a stainless steel autoclave in a Dry Ice-acetone bath to 50 to 60° below zero, and while the autoclave is at this temperature to load it with the reactants, namely; ammonium chloride, meta nitro para cresol, aqueous ammonia and anhydrous ammonia cooled to a similar temperature range. After the vessel is loaded, the autoclave is closed, and the temperature allowed to gain up to room temperature. Thereafter, the temperature of the reactants is raised to a range of at least about 125° C. but not more than about 145° C. The contents of the autoclave are kept agitated by shaking. The time of reaction will vary in accordance with the conditions and the concentration of the reactants used. Usually the reaction time is more than 5 hours. However, while the duration of time of reaction does not appear to be particularly critical and reaction conditions can be maintained for as long as 30 and 40 hours, the above conditions are usual in practice of batch production methods. In the present cyclic operations five to twenty hours' reaction time is usual. Intermediate times within this range are preferred. A few runs at varying times under otherwise standard conditions will indicate the optimum time of reaction for the particular conditions within the described ranges selected.

In the laboratory procedure, during initial stages of the investigation of the process after amination had been completed the autoclave was allowed to cool to 110° C. and the pressure vented carefully. Upon reaching standard room pressure and temperature conditions below about 110° C. the contents of the autoclave were slurried with water and made slightly alkaline with aqueous caustic soda solution. The crude product was filtered and washed. The filtrate and washings were acidified to recover unreacted cresol. The crude meta nitro para toluidine was extracted with hot toluene and treated with an especially prepared fuller's earth ("Superfiltrol") and refiltered to remove impurities. Meta nitro para toluidine was recovered by recrystallization. The yield of pure product was determined from the weight of the recovered crystals.

The following 13 examples are illustrative. The advance over the basic process as illustrated in Examples 1 to 9 is specifically shown in Examples 10 through 13. Where confusion may arise with art most nearly pertaining thereto, examples are also given for comparative purposes. While the examples are not exhaustive, they are illustrative of the best method of practice of our improved cyclic process and differentiate over results obtained in known prior art processes by direct comparison therewith as to the basic process described and claimed in U.S. Serial No. 585,978 of May 21, 1956, co-pending herewith.

*Example I*

A two liter stainless steel autoclave was cooled to 50 to 60° below zero C. in a Dry Ice-acetone bath. 150 parts ammonium chloride, 250 parts distilled meta nitro para cresol, 427 parts 28% ammonia (aqueous solution) and 189 parts anhydrous ammonia were weighed into the autoclave and the vessel closed. After two and one half hours' processing time the temperature reached 140° C. and the pressure in the vessel measured 625 to 630 pounds per square inch. The contents were kept mixing by shaking the autoclave. Temperature conditions of 140° C. were maintained for 30 hours. The autoclave was allowed to cool and the ammonia vented slowly. After venting, the contents of the autoclave were at about 110° C. whereupon the contents were slurried up with about 1000 parts water and five parts caustic. The product was then filtered and washed, the filtrate and washings worked up to recover unreacted cresols. Dried residue of crude MNPT recovered totaled 229 grams. The yields, based on MNPC consumed, was 95.6%. The crude was extracted with hot toluene, treated with fuller's earth ("Superfiltrol") and the MNPT recovered by crystallization. The amination yield of purified product was 92% (average—three runs) and the conversion yield was 83% of the meta nitro para cresol initial added. The molar ratio of $NH_3$ to $H_2O$ is about 1:1.

*Example II*

A run was made similar to that in Example I, but the meta nitro para cresol was contaminated with 0.001% of ferrous ion. The amination yield dropped from 92% to 77% and the conversion yield fell from 93% to 75%.

Similar runs using sodium, aluminum, nickel, copper and other metal ions likely to be contaminants, disclosed the extreme sensitivity of the reaction to the presence of the metal ions tried, and a marked drop-off in yield. While high yields could be obtained in 316 stainless steel vessels and glass, it was found essential to consistent high yield to make an initial series of runs in new metal vessels to condition the surface thereof to obtain high yields of product.

*Example III*

In equipment similar to that used in Example I, 1000 parts 28% $NH_4OH$, 111 parts sodium formate and 250 parts meta nitro para cresol were heated to a temperature of 150° C. whereupon a pressure of 240#/sq. in. were developed. Conditions were maintained for 6 hours. The autoclave was cooled and vented and the purified MNPT recovered. The amination yield was 35% and no unreacted meta nitro para cresol was recoverable or recovered from the residue. This process is described by Frye and Vagenius in U.S. 2,128,700.

*Example IV*

In equipment similar to the previous examples, 250 parts meta nitro para cresol, 108 parts ammonium chloride and 544 parts 10% aqueous ammonia solution were heated for 12 hours at 200° C. No meta nitro para toluidine was recovered.

*Example V*

Similar to Example IV, with the exception that the temperature was dropped to 160° C. The amination yield was 29.3. The amount of meta nitro para cresol recovered was 102 parts and the conversion yield was 17.3%. 43 parts MNPT were recovered.

Example IV is drawn from German Patent 49,060 of August 21, 1889, which relates to amination of dihydric phenols and Example V applies the temperature of Frye et al. to the German process.

These examples demonstrate lack of analogy between amination of nitro cresol and dihydric phenols.

*Example VI*

In equipment as used in the prior examples, 250 parts meta nitro para cresol, 90 parts ammonium chloride, 770 parts 28% aqueous ammonia and 90 parts anhydrous ammonia were reacted at 140° C. and pressure of 370#/sq. in. for twelve hours. No nitro cresol was recovered and the yield of meta nitro para toluidine fell to 56.1%.

The example illustrates the importance of the molar ratio of ammonia to water. Here the ratio is 1:1.7.

*Example VII*

248.6 parts nitro cresol, 126 parts 28% ammonium hydroxide, 107 parts anhydrous ammonia were processed in equipment as in the prior examples at a temperature of 140° C. for a time of 36 hours. The amination yield was 78% and the conversion yield 66%.

Absence of ammonium chloride from the reaction accounts for lower yield.

*Example VIII*

In this example 2 mols of meta nitro para cresol were aminated in a ten fold excess of ammonia in aqueous solution where the molar ratio of ammonia to water was 1.15:1 in the presence of 1 mol of ammonium chloride at a temperature of 140° C. for 36 hours.

The amination yield was 81.4%, the conversion yield 76.2% and there was 9.8% carbonaceous residue. Note that the yield is of inferior nature when the ratio of ammonium chloride to nitro cresol is not at least in excess of 0.5:1.

*Example IX*

In equipment similar to that used in Example I; one mol meta nitro para cresol, four mols ammonium chloride, 7.2 mols NH₃ and 17.1 mols water were heated to 140° C. for 66 hours under good agitation. (Corresponds to 29.6% aqueous ammonia or a mol ratio of ammonia to water of 1:2.5.)

The amination yield was 75.4%, the conversion yield was 72.4% and there was recovered 14.8% carbonaceous residue. Here, the molar excess of NH₃ is low (6.2 moles), the ratio of ammonia to water is low (1:2.4) although compensation was attempted in the quantity of ammonium chloride used.

*Example X*

The experimental work was carried out in a 20 gallon 316 stainless steel reactor, equipped with an electronically controlled steam heated jacket and a 316 stainless steel propeller type agitator driven at 210 r.p.m. Molten meta nitro para cresol was stored at 35–40° C. in a 10 gallon 316 stainless steel pressure vessel, from whence it was transferred in metered quantity to the 20 gallon reactor by nitrogen pressure. Anhydrous ammonia was measured out in a 2 gallon 316 stainless steel pressure vessel, and was transferred to the 20 gallon reactor by nitrogen pressure. The additional amounts of ammonium chloride needed to restore the material balance in the 20 gallon reactor between amination cycles were introduced in solution in the anhydrous ammonia, in which ammonium chloride is readily soluble (50% by weight at room temperature). At the end of the amination, e.g. five to about sixteen hours, the agitator was turned off and the reaction liquors were allowed to settle for thirty minutes, maintaining the temperature at reaction value, 140° C. The lower oil phase was drawn off through the bottom outlet of the 20 gallon vessel into 2% aqueous sodium hydroxide, where the meta nitro para toluidine was precipitated in finely granular condition, and was filtered off and washed, subsequently being purified by recrystallization from toluene solution. Alternatively, the oil phase may be drawn off directly into toluene, where it remains in solution, this solution being subsequently extracted with 2% aqueous sodium hydroxide to remove meta nitro para cresol. The upper aqueous phase was retained in the 20 gallon vessel. The aqueous phase was then re-adjusted in the charge to amination proportions as set out above.

The boundary between oil and water phases may be readily determined. This has been done visually by means of a Jerguson transparent gauge. In this example the separation point was determined by means of the Bendix nuclear density gauge, Series 804. Other means are obviously not precluded.

In the re-cycling process the initial charge was in the following proportions: 1.0 mol meta nitro para cresol, 1.7 mols ammonium chloride, 10.0 mols anhydrous ammonia, 4.7 mols water. This gives an aqueous ammonia of 66.7% concentration by weight. The amination temperature was 140° C.; and this resulted in an amination pressure of about 670 p.s.i.

The object of the re-charging operations at the end of an amination was to restore the original reacting proportions; and hence the amounts re-charged depend altogether upon the operating conditions and are determined by weighing the quantities withdrawn. Further, since for every mol of meta nitro para toluidine produced in the amination reaction one mol of water is also produced, it is necessary to draw off a sufficient quantity of water with each successive cycle to avoid water dilution of the reactants as indicated to be critical. Typically the composition of the oil phase is as follows:

| | Percent |
|---|---|
| Meta nitro para toluidine | 48.5 |
| Meta nitro para cresol | 7.2 |
| By-products | 0.7 |
| Water | 14.5 |
| Ammonia | 19.8 |
| Ammonium chloride | 9.4 | while the composition of the aqueous phase is as follows:

| | Percent |
|---|---|
| Meta nitro para toluidine | 13.2 |
| Meta nitro para cresol | 6.4 |
| By-products | 0.4 |
| Water | 22.0 |
| Ammonia | 35.9 |
| Ammonium chloride | 22.1 | and the ratio by weight of oil phase to water phase is 1 to 2.

The following two experimental examples illustrate the operation of the process for a re-cycling series of ten and of five members respectively.

Example XI

Initial charge in 20 gallon vessel:

36.0 lbs. meta nitro para cresol
21.6 lbs. ammonium chloride
20.0 lbs. water
40.0 lbs. anhydrous ammonia heated at 140° C. for 16 hours with agitation. Allowed to settle for 30 minutes. Oil phase, amounting to about 40 lbs., withdrawn.

Charged back into 20 gallon vessel:

22.2 lbs. meta nitro para cresol
3.6 lbs. ammonium chloride
9.6 lbs. anhydrous ammonia
3.0 lbs. water heated at 140° C. for 16 hours with agitation, and the procedure repeated over ten cycles.

Example XII

For a ten run series following conditions as set out in Example XI, the experimental performance was as follows:

184.7 lbs. meta nitro para toluidine produced for consumption of the following raw materials:

193.4 lbs. meta nitro para cresol
126.7 lbs. anhydrous ammonia
40.5 lbs. ammonium chloride This corresponds to a yield of 96.3%.

Example XIII

Following the same procedure as outlined in Example XI, a five run series was carried out with the following performance:

106.0 lbs. meta nitro para toluidine produced for consumption of the following raw materials:

112.9 lbs. meta nitro para cresol
70.4 lbs. anhydrous ammonia
29.6 lbs. ammonium chloride This corresponds to a 94.7% yield.

The above examples illustrate that in obtaining a high yield of meta nitro para toluidine by amination of meta nitro para cresol the conditions under which the reaction is carried out may be varied only slightly. However, it is possible to operate under conditions outside a preferred range at a correlative sacrifice in overall yield of the desired product. In its broadest aspects minimum concentrations of reactants are such that there is at least ½ mol of ammonium chloride per mol of cresol; at least 7 mols of NH₃ per mol of cresol and at least ½ mol of NH₃ per mol of water. Minimum temperature and maximum temperature are both critical. In the broadest aspect a temperature below 125° C. is not effective, 130° C. is useful but not preferred, 140° C. is prefererd, 145° C. is useful and at 150° C. tars start to develop in objectionable amount. The time of reaction appears to vary from 5 to about fifty hours, but is less critical above about 6 hours because of the re-cycle technique than other factors in the process.

Having described and illustrated the best mode of practicing our improved process for aminating meta nitro para cresol in and by a cyclic process, what we claim as our invention is:

1. A process for the continuous production of meta nitro para toluidine which comprises subjecting one molar proportion of meta nitro para cresol, in excess of one-half mol of ammonium chloride, a minimum of six mols of ammonia in an aqueous environment wherein the molar ratio of ammonia to water is greater in numerical value than 1:2 in an autoclave to the autogenous pressure developed therein at a temperature above 125° C. but less than 165° C. for a time in excess of five hours but insufficient to complete substantially the ammonolysis of said cresol, separating under pressure the reactant medium into a heavy oil phase and a lighter aqueous phase, maintaining the reaction vessel under pressure while bleeding off the heavy oil phase from the reaction vessel, recovering the meta nitro para toluidine from said oil phase, pressure feeding make-up quantities of ammonia, ammonium chloride and meta nitro para cresol to re-establish the minimum initial concentration conditions in the reaction vessel containing the reacted light aqueous phase and repeating the time-temperature schedule of reaction, heavy oil phase withdrawal and make-up addition in order as aforesaid.

2. A method of manufacture of meta nitro para toluidine which comprises subjecting one molar proportion of meta nitro para cresol, a minimum of one mol of ammonium chloride, a minimum of six mols of ammonia in an aqueous environment wherein the molar ratio of ammonia to water is greater in numerical value than 1:2 in an autoclave to the autogenous pressure developed therein at a temperature of at least 125° C. but not in excess of about 145° C. for a time in excess of five hours but insufficient to complete substantially the ammonolysis of said cresol, separating under pressure the reactant medium into a heavy oil phase and a lighter aqueous phase, maintaining the reaction vessel under pressure while bleeding off the heavy oil phase from the reaction vessel, recovering the meta nitro para toluidine from said oil phase, pressure feeding make-up quantities of ammonia, ammonium chloride and meta nitro para cresol in quantities sufficient to re-establish the initial concentration conditions in the reaction vessel containing the reacted light aqueous phase and repeating the time-temperature schedule of a reaction, heavy oil phase withdrawal and make-up addition in order as aforesaid.

3. A method of manufacture of meta nitro para toluidine which comprises subjecting one molar proportion of meta nitro para cresol, a minimum of one mol of ammonium chloride and about eight mols of ammonia in an aqueous environent wherein the molar ratio of ammonia to water is greater than 1:2 in an autoclave to the autogenous pressure developed therein at a temperature of from 130° to not more than 145° C. for a time in excess of five hours but insufficient to complete substantially the ammonolysis of said cresol, separating under pressure the reactant medium into a heavy oil phase and a lighter aqueous phase, maintaining the reaction vessel under pressure while bleeding off the heavy oil phase from the reaction vessel, recovering the meta nitro para toluidine from said oil phase, pressure feeding make-up quantities of ammonia, ammonium chloride and meta nitro para cresol in quantities sufficient to re-establish initial component concentration conditions repeating the time-temperature schedule of reaction, heavy oil phase withdrawal and make-up addition in order as aforesaid.

4. A method for the manufacture of meta nitro para toluidine which comprises subjecting one molar proportion of meta nitro para cresol, about two mols of ammonium chloride and about ten mols of ammonia in an aqueous environment wherein the molar ratio of ammonia to water is greater than 1:2 in an autoclave to the autogenous pressure developed therein at a temperature of from 135 to 145° C. for a time in excess of five hours but insufficient to complete substantially the ammonolysis of said cresol, separating under pressure the reactant medium into a heavy oil phase and a lighter aqueous phase, maintaining the reaction vessel under pressure while bleeding off the heavy oil phase from the reaction vessel, recovering the meta nitro para toluidine from said oil phase, pressure feeding make-up quantities of ammonia, ammonium chloride and meta nitro para cresol to re-establish quantitatively the initial reaction concentration conditions in the reaction vessel containing the separated reacted light aqueous phase and repeating the time-temperature schedule of reaction, heavy oil phase withdrawal and make-up addition in order as aforesaid.

5. A method for the manufacture of meta nitro para toluidine comprising heating together in an autoclave at autogenous pressure at a temperature above 125° but less than 150° C. one mol of meta nitro para cresol, a minimum of one mol of ammonium chloride and a minimum of six mols of ammonia in a metal ion free aqueous environment wherein the molar ratio of ammonia to water is greater in numerical value than 1:2 for from five to about twenty hours, separating under pressure the reactant medium into a heavy oil phase and a lighter aqueous phase, maintaining the reaction vessel under pressure while bleeding off the heavy oil phase from the reaction vessel, recovering the meta nitro para toluidine from said oil phase, pressure feeding make-up quantities of ammonia, ammonium chloride and meta nitro para cresol to re-establish the initial reaction concentration conditions recited above in the reaction vessel containing the reacted light aqueous phase and repeating the time-temperature schedule of reaction, heavy oil phase withdrawal and make-up addition in order as aforesaid.

6. A method for the manufacture of meta nitro para toluidine which comprises heating together one mol of meta nitro para cresol, a minimum of one mol of ammonium chloride and a minimum of eight mols of ammonia in a metal ion free aqueous environment wherein the molar ratio of ammonia to water is between 1:2 and 6:1 in an autoclave to the autogenous pressure developed therein at a temperature in excess of 125° but not substantially in excess of 145° C. for a time in excess of five hours but insufficient to complete substantially the ammonolysis of said cresol, separating under pressure the reactant medium into a heavy oil phase and a lighter aqueous phase, maintaining the reaction vessel under pressure while bleeding off the heavy oil phase from the reaction vessel, recovering the meta nitro para toluidine from said oil phase, pressure feeding make-up quantities of ammonia, ammonium chloride and meta nitro para cresol to re-establish the initial reaction concentration conditions and repeating the time-temperature schedule of reaction, heavy oil phase withdrawal and make-up addition in order as aforesaid.

No references cited.